(12) United States Patent
Winarski et al.

(10) Patent No.: US 6,822,820 B1
(45) Date of Patent: *Nov. 23, 2004

(54) APPARATUS FOR DETECTING DAMAGE TO THE TRANSDUCER HEAD AND/OR TAPE GUIDE OF AN INTERACTIVE MEDIA DEVICE

(75) Inventors: Daniel J. Winarski, Tucson, AZ (US);
Lee C. Randall, Tucson, AZ (US);
Craig A. Klein, Tucson, AZ (US);
Robert G. Emberty, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 651 days.

This patent is subject to a terminal disclaimer.

(21) Appl. No.: 09/932,252

(22) Filed: Oct. 19, 2000

(51) Int. Cl.$^7$ .............................................. G11B 15/18
(52) U.S. Cl. ........................... 360/69; 360/69; 360/75; 360/31; 360/55; 360/130.2; 360/130.24; 360/130.21; 360/130.22; 360/130.23; 29/603.09; 324/262
(58) Field of Search ............................ 360/71, 69, 60, 360/75, 72, 130.2, 130.24, 31, 55, 130.21, 130.22, 130.23; 324/262; 29/603.09

(56) References Cited

U.S. PATENT DOCUMENTS

| | | | |
|---|---|---|---|
| 3,746,231 A | * | 7/1973 | Del Rio ...................... 226/177 |
| 3,823,416 A | | 7/1974 | Warner |
| 4,130,847 A | | 12/1978 | Head et al. |
| 4,809,104 A | | 2/1989 | Knudsen et al. |
| 5,077,724 A | * | 12/1991 | Gregg ........................ 369/258 |
| 5,237,476 A | | 8/1993 | Bischoff et al. |
| 5,377,052 A | | 12/1994 | Guzman et al. |
| 5,495,371 A | * | 2/1996 | Munemoto et al. ........... 360/71 |
| 5,508,865 A | | 4/1996 | La Garcia et al. |
| 5,636,085 A | | 6/1997 | Jones et al. |
| 5,734,535 A | * | 3/1998 | Nakata et al. .............. 360/125 |
| 5,751,527 A | | 5/1998 | Sundaram et al. |
| 5,953,184 A | | 9/1999 | Barber et al. |
| 6,657,806 B1 | * | 12/2003 | Winarski et al. .............. 360/69 |

FOREIGN PATENT DOCUMENTS

JP  35-9016125  *  1/1982  ................. 360/122

* cited by examiner

Primary Examiner—David Hudspeth
Assistant Examiner—Natalia Figueroa
(74) Attorney, Agent, or Firm—Robert M. Sullivan; Dillon & Yudell LLP

(57) ABSTRACT

A data tape drive for recording information on the data tape of a tape cartridge has a transducer head with air bleed slots that define side walls, a tape guide, and a device for detecting damage to the transducer head and tape guide. The damage detection device has a conductor loop that is located along the outer edges of the air bleed slots and tape guide for detecting any brittle fracture damage that may be present. The conductor loop is a thin filament of wire that is preferably attached to the ends of the side walls. When the transducer head or tape guide experiences a fracture, such as a fracture in one of the side walls, the delicate filament breaks and forms an open circuit. The open circuit in the conductor loop is detected by the data tape drive so that remedial actions can be taken. Without the damage detection device, large quantities of the data tape moving past the transducer head and/or tape guide would be scraped over or gouged by the fracture and permanently damaged, including loss of the information recorded on the data tape.

35 Claims, 5 Drawing Sheets

APPARATUS FOR DETECTING DAMAGE TO THE TRANSDUCER HEAD AND/OR TAPE GUIDE OF AN INTERACTIVE MEDIA DEVICE

This application is related to a co-pending patent application Ser. No. 09/692,285, entitled "Method for Detecting Damage to the Transducer Head and/or Tape Guide of an Interactive Media Device," which is incorporated herein by reference.

BACKGROUND OF THE INVENTION

1. Technical Field:

The present invention relates in general to an improved means for monitoring the physical condition of a data recording device, and in particular to an improved means for identifying damage to the components of a data recording device. Still more particularly, the present invention relates to an improved apparatus for detecting fractures in a recording head or tape guide in a data tape drive.

2. Description of the Prior Art:

Data recording devices, such as data tape drives, record information to or read information from media in a storage device, such as the data tape of a tape cartridge. As shown in FIG. 1, data tape drives utilize one or more transducer heads 1 having air bleed grooves or slots 3 that define side walls 5. The air bleed slots 3 are provided for optimizing the performance of the transducer head 1. For example, U.S. Pat. No. 5,636,085 discloses a magnetic read/write assembly for a flexible disk drive having rails with air bleed slots that enable a low flying height for the media relative to the electromagnetic elements.

Referring again to FIG. 1, air bleed slots 3 are typically formed in the transducer head 1 in a direction that is perpendicular to the direction of travel of the tape (indicated by arrows 7). However, the slots also may be formed or cut in directions parallel to the direction of travel of the magnetic tape. The air bleed slots allow the tape to ride closer to the read and write elements in the head by bleeding off the boundary layer air which sticks to the moving tape. Although tape tension is used to wrap the tape over the head, high density recording requires the tape to hydrodynamically fly extremely close to the recording elements.

Transducer heads and the tape guides adjacent to them are typically formed from sensitive materials that are somewhat brittle in nature, and are subject to brittle fracture damage due to vibration, shock, and incidental contact with the media. When air bleed slots or other mechanical formations are formed in transducer heads and tape guides, areas of stress concentration occur and may increase the likelihood of damage to these components. The side walls of the transducer head are particularly vulnerable to stress concentrations and fractures. When a transducer head or tape guide is damaged, the media or data tape may be exposed to the sharp edges 9 (FIG. 1) of the fracture. Unless the situation is quickly remedied, extensive amounts of the media can be damaged or destroyed, and valuable information can be permanently lost. Thus, an apparatus for detecting damage to the transducer head and tape guide of a data recording device is needed.

SUMMARY OF THE INVENTION

A data tape drive for recording information on the data tape of a tape cartridge has a transducer head with air bleed slots that define side walls, a tape guide, and a device for detecting damage to the transducer head and tape guide. The damage detection device has a conductor loop that is located along the outer edges of the air bleed slots and tape guide for detecting any brittle fracture damage that may be present. The conductor loop is a thin filament of wire that is preferably attached to the ends of the side walls. Alternatively, the filament is mounted along the side walls just below the top surface of the side walls to avoid contact with the moving data tape during operation of the data tape drive. When the transducer head or tape guide experiences a fracture, such as a fracture in one of the side walls, the delicate filament breaks and forms an open circuit. The open circuit in the conductor loop is detected by the data tape drive so that remedial actions can be taken. Without the damage detection device, large quantities of the data tape moving past the transducer head and/or tape guide would be scraped over or gouged by the fracture and permanently damaged, including loss of the information recorded on the data tape.

The foregoing and other objects and advantages of the present invention will be apparent to those skilled in the art, in view of the following detailed description of the preferred embodiment of the present invention, taken in conjunction with the appended claims and the accompanying drawings.

DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DESCRIPTION OF THE PREFERRED EMBODIMENT

Figure 2:
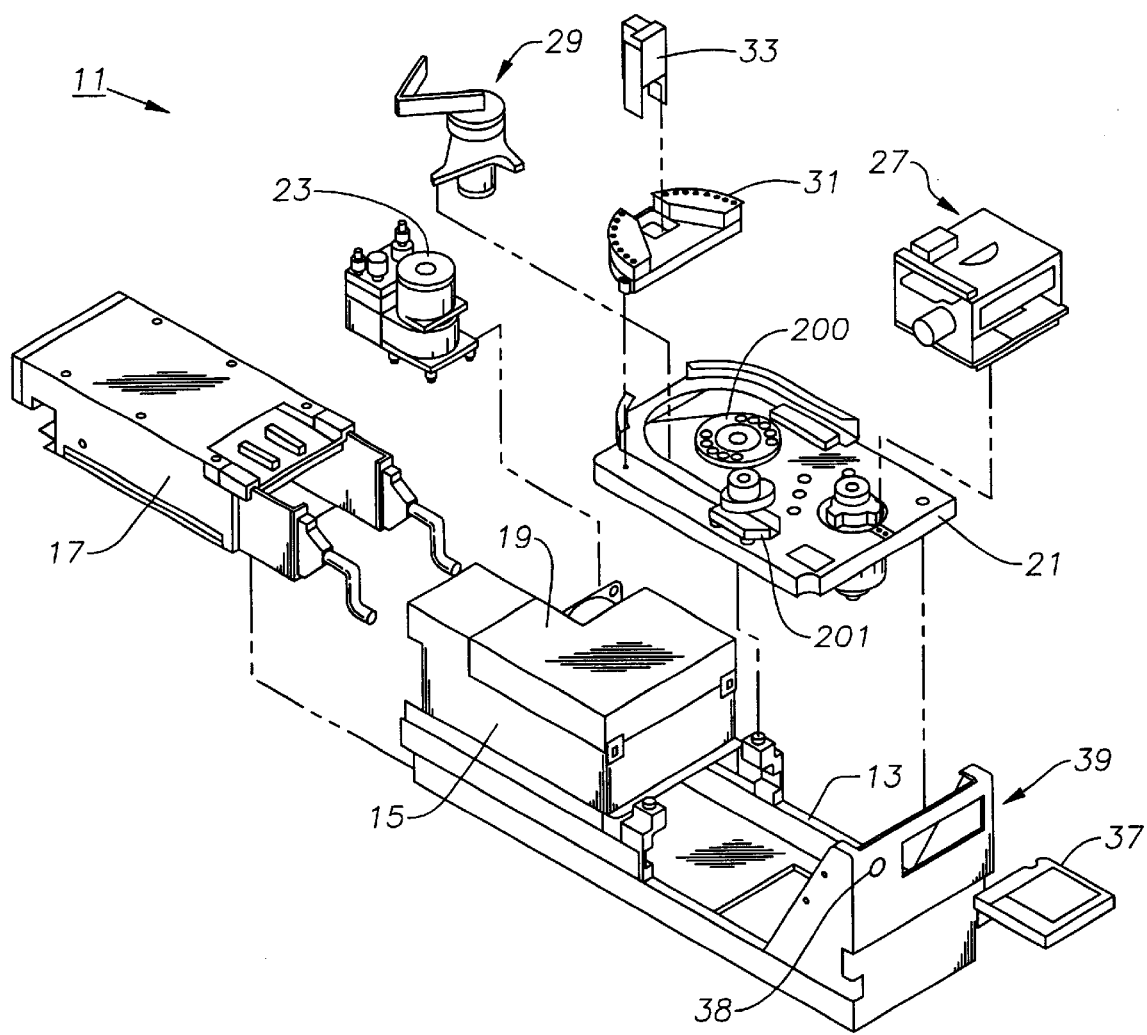
FIG. 2 is an exploded isometric view of a magnetic tape drive constructed in accordance with the invention.

Referring to FIG. 2, a magnetic tape drive 11 in which the present invention may be incorporated is shown. Although a magnetic tape drive is illustrated, one skilled in the art will recognize that air bearing sliders on the magnetic heads used in disk drives with removable media, an optical media drive, such as a CD-ROM device, a Near Field Recording device that combines magnetic and optical recording, or other devices having transducer heads for processing information with media, such as reading information from and/or writing information to media, also may employ the present invention. Drive 11 includes a base unit 13 to which are mounted a power supply 15, various electronic circuit cards 17, 19 (such as motion control and data control), a deck assembly 21, a pneumatic assembly 23 that provides pressurized air, and a tape tension transducer 201 that measures the tension in the data tape and feeds back that information to cards 17, 19. Mounted to the deck assembly 21 are a loader mechanism 27, drive motors (not shown), a pantocam assembly 29, and a head guide assembly 31. A head actuator assembly 33 is mounted to the head guide assembly 31. Drive 11 can operate in stand alone and automated tape loader environments interconnected with a host computer and also can be incorporated into a multi-drive automated data storage and retrieval system or library.

Figure 3:
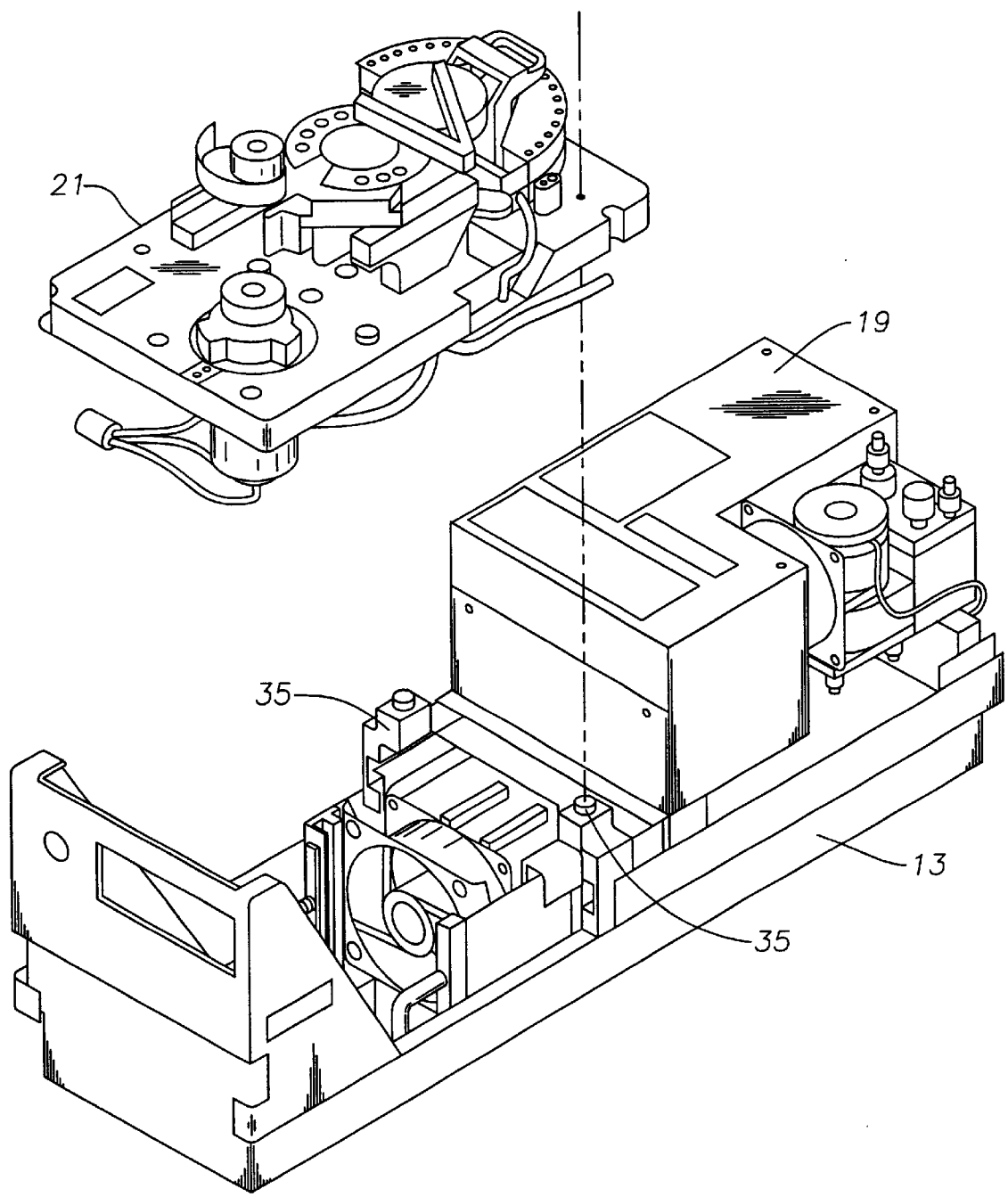
FIG. 3 is an isometric view of the tape drive of FIG. 2 to be mounted on a chassis having shock mounts for isolation therebetween.

As shown in FIG. 3, shock mounts 35 are supported by the base unit 13 for isolating the deck assembly 21 from shock. Shock mounts 35 are stud-mounted-type shock mounts for assembly ease. Four shock mounts 35 (only two are shown) are positioned approximately equidistant from the center of gravity of deck assembly 21.

Figure 4:
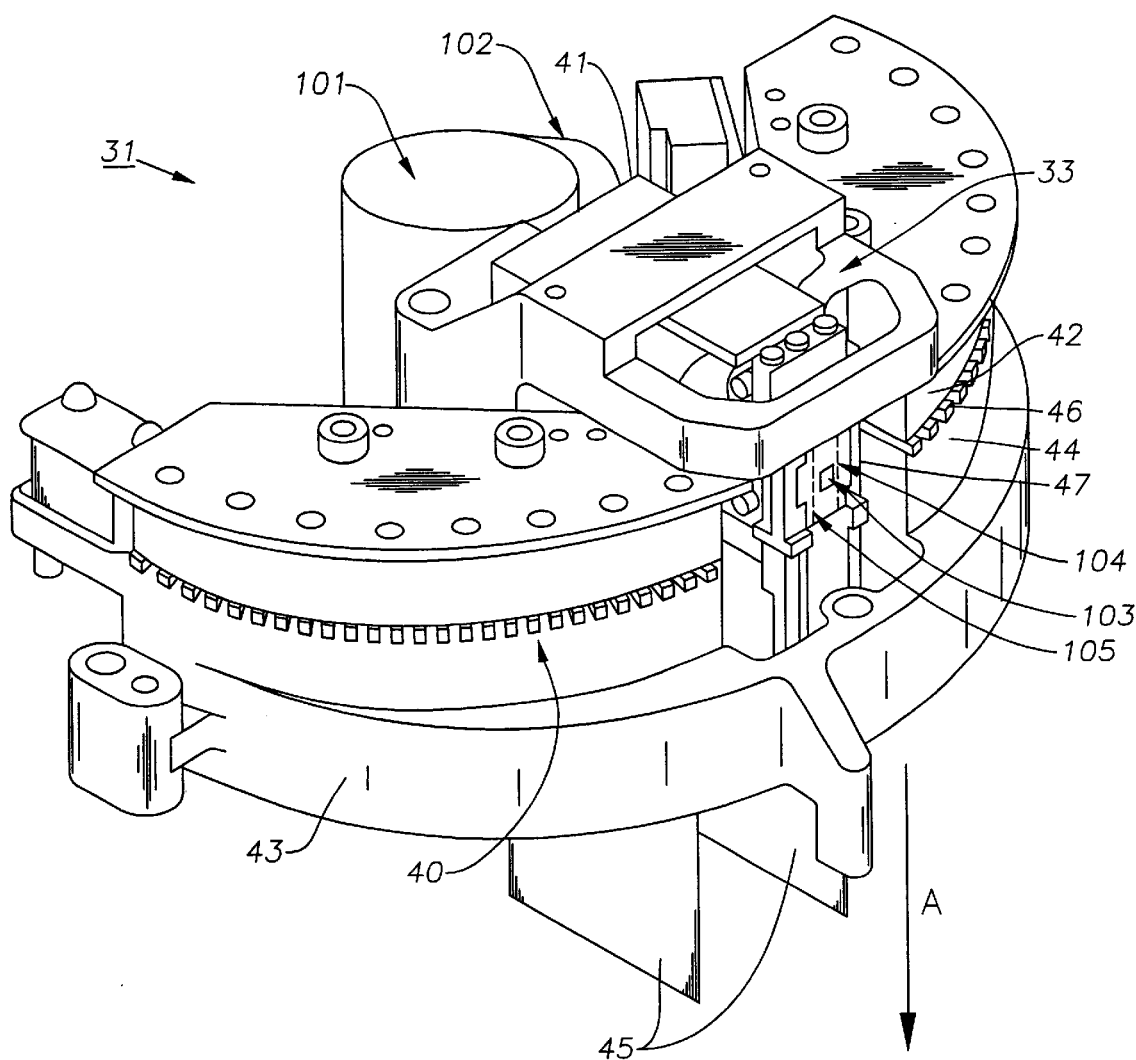
FIG. 4 is an isometric view of a head guide assembly of the tape drive of FIG. 2 having a head actuator assembly mounted therein.

Referring now to FIG. 4, actuator assembly 33 of head guide assembly 31 is secured to a base member 41. Base member 41 is coupled to a head guide support 43. Various brackets and screws secure the elements of the actuator assembly 33 together. Various cables, including ribbon cables 45 for the transducer or input/output recording head 47, interconnect the head and the coil with the circuit cards of drive 11. To reduce mechanical interference by ribbon cables 45 with proper motion of a beam member, ribbon cables 45 are preferably guided upwards along the sides of the beam member and outwardly from the base member 41 by winged surfaces inside the beam member. Head 47 may comprise a device that is read only, write-once, or one that can perform both read and write functions.

Figure 5:
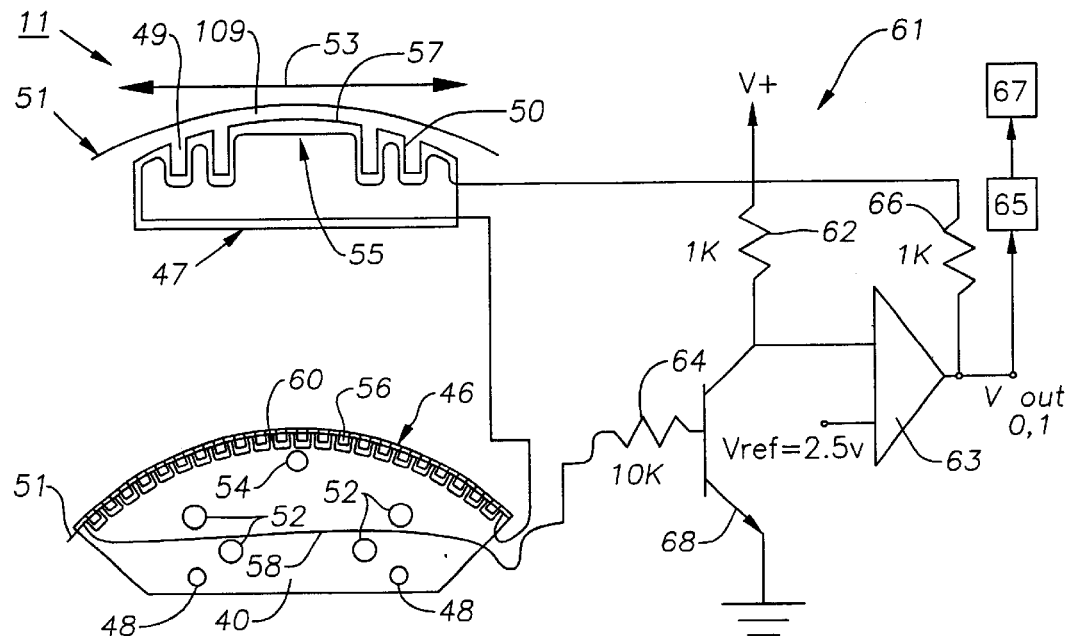
FIG. 5 is a schematic diagram of the tape drive of FIG. 2 having a transducer head and tape guide constructed in accordance with the invention.

An arcuate tape guide 40 is located immediately adjacent to each side of head 47 for precisely conveying data tape toward and away from head 47. In the embodiment shown, an alumina ceramic, flat plate-like tape guide 40 is supported from above by D-bearings 42, and from below by lower support members 44 that are spaced apart from each other to provide a slot for tape guide 40. As best shown in FIG. 5, tape guide 40 has a row of teeth 46 that define the arcuate guide path for the data tape, locating pin slots or holes 48, mounting bolt holes 52, and an air vent 54 for hydrostatic air delivered to the head guide assembly 31. A more detailed disclosure of drive 11 is shown and described in U.S. Pat. Nos. 5,508,865, and 5,377,052, which are incorporated herein by reference.

During operation of drive 11, a removable tape cartridge 37 (FIG. 2) having a supply reel wound with magnetic tape is inserted through a slot 39 in a front face of base unit 13, and into loader assembly 27. A warning indicator 38 is located adjacent to slot 39 and will be described in further detail below. Loader assembly 27 draws the tape cartridge 37 in and lowers it onto the deck assembly 21. The pantocam assembly 29 engages the tape leader block attached to a free end of the magnetic tape and pulls the magnetic tape around the head guide assembly 31 such that the magnetic tape winds through the tape path defined by tape guide 40, and across the magnetic tape head 47 mounted to the head actuator assembly 33. The leader block is then engaged by a take-up reel 200 on the deck assembly 21 and drive 11 is then ready to record information to or read information from the magnetic tape. While drive 11 includes a take-up reel and accepts tape cartridges containing only the supply reel, the present invention is not limited to use with such a drive or cartridge combination, but also could be incorporated in other drive or cartridge combinations, such as those in which the tape cartridge contains both supply and take-up reels. A two-reel tape cartridge is also called a dual-reel cassette.

Referring again to FIG. 4, a solenoid 101 controls the flow of pressurized air through a hose 102 to head 47. Head 47 has an orifice 103 that is typically located between or to the sides of columns of I/O elements 104, 105. The data tape normally flies over I/O elements 104, 105 via a hydrodynamic air film 109 (see FIG. 5). A hydrodynamic air film is preferred for a good head, because hydrodynamic air films are very thin. A thin hydrodynamic air film allows the data tape 51 to fly very close to I/O elements 104, 105, which allows the transfer of data between tape 51 and the I/O elements of head 47. The thickness of a hydrodynamic air film is a few microinches.

Tape 51 also flies over D-bearings 42 via a very thick hydrostatic air film 99. Hydrostatic air films are typically orders of magnitude thicker than hydrodynamic air films (in the range of the thickness of tape 51), which is a few thousandths of an inch rather than mere microinches. Since tape 51 should not physically contact D-bearings 42, and since D-bearings 42 only facilitate the guiding of tape 51 over head 47, a thick layer of hydrostatic air between tape 51 and D-bearings 42 is desirable, especially in the event that head 47 fractures.

Referring again to FIG. 5, a schematic diagram of a portion of drive 11, tape guide 40, and transducer head 47 constructed in accordance with the present invention is shown. A plurality of air bleed slots 49 that define side walls 50 are formed in the ferrite block or base comprising head 47, along with the input/output elements. Magnetic tape 51 passes in a generally arcuate path over head 47 and slots 49 in the directions of travel indicated by arrows 53. Head 47 is also provided with a delicate or brittle electrically conductive means or a conductor loop 55. In one version, conductor loop 55 extends along the perimeter of head 47, and preferably comprises a thin film conductor or wire that is laminated to the top and bottom surfaces of head 47. Alternatively, conductor loop 55 is mounted along sides of head 47 just below an outer or tape surface 57 thereof to avoid contact with tape 51 while the tape is moving during operation of drive 11.

Figure 6:
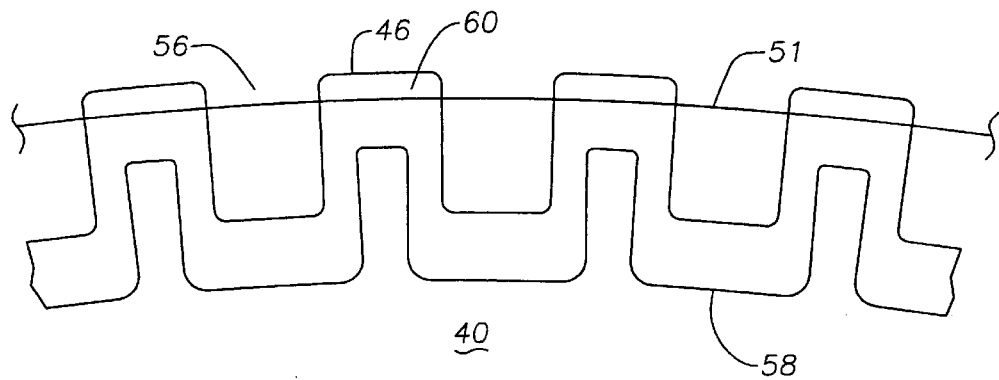
FIG. 6 is an enlarged front view of a portion of the tape guide of FIG. 5.

As shown in FIGS. 5 and 6, the curved array of teeth 46 in tape guide 40 define grooves 56 therebetween, and each tooth 46 has a tape surface 60 that is essentially perpendicular to tape 51. Like head 47, tape guide 40 is provided with a conductor loop 58 that extends along the perimeters of tape guide 40 and teeth 46. In one version, loop 58 comprises a thin film conductor or wire that is laminated to tape surface 60 of tape guide 40 (FIGS. 5 and 6). In this version, loop 58 is mounted along tape surface 60 to avoid contact with tape 51 while the tape is moving during operation of drive 11. However, loop 58 is preferably located on the opposite side of tape surface 60.

Figure 7:
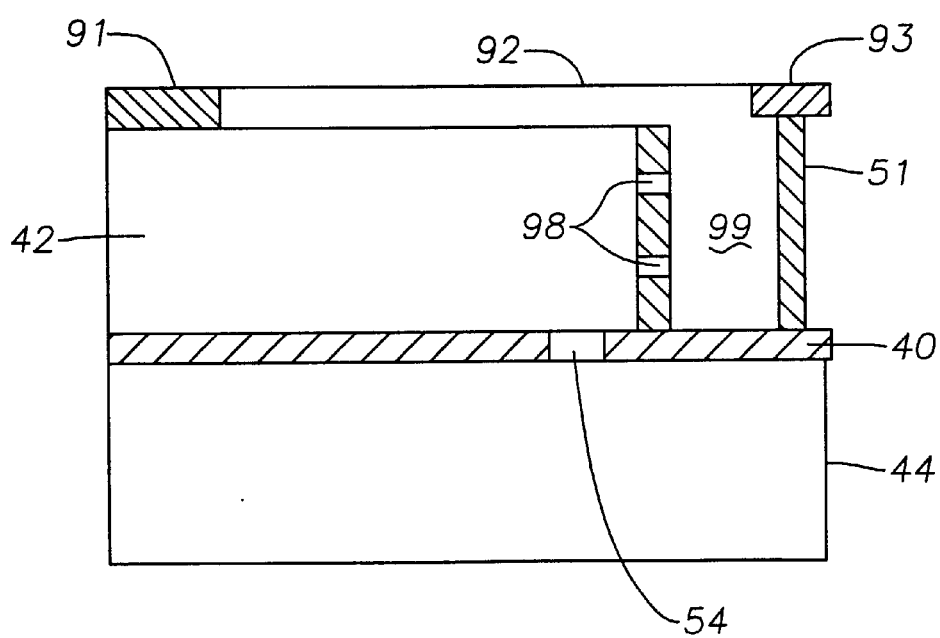
FIG. 7 is a schematic sectional side view of the tape guide of FIG. 5.

Referring now to FIG. 7, the face of D-bearing 42 is a portion of a right circular cylinder. D-bearing 42 accepts pressurized air through hole 54, as provided by pneumatic assembly 23, and vents the pressurized air through holes 98 (approximately 0.010 inches in diameter) to form the hydrostatic air film or bearing 99, which supports tape 51. The pressure of hydrostatic film 99 is described by the expression $P=T/RW$, wherein T is the tension of tape 51 as measured by tension transducer 201 (FIG. 2), R is the outer radius of D-bearing 42, and W is the width of tape 51. The gaps 56 (FIG. 5) between teeth 46 of tape guide 40 vent hydrostatic air film 99. If hydrostatic air film 99 is not vented along the lower edge of tape 51, hydrostatic air film 99 will collapse and form a tension gradient in tape 51 across the width of tape 51. Ceramic plugs 93 are located along the top edge of tape 51 and only act on the edge of tape 51 in a few places, but do not seal the upper edge of tape 51. Thus, the upper edge of tape 51 is self-venting and the lower edge of tape 51 needs venting of the gaps 56 between teeth 46. Offset block 91 is used to mount a leaf spring 92, to which ceramic plug 93 is attached.

When a fracture in the side walls forming the air bleed slots 49 of head 47, or in the teeth 46 of tape guide 40 occurs, an open circuit is produced in conductor loops 55, 58, respectively. Drive 11 is provided with a circuit 61 that senses the open circuit in either or both conductor loops 55, 58. For example, in the embodiment shown, circuit 61 is provided with resistors 62, 64, 66 a transistor 68, and a threshold comparator 63 for sensing when loops 55, 58 are opened or fractured. In the preferred embodiment, transistor 68 is an NPN switching transistor 2N2222, beta~100, and comparator 63 is an LM139. Threshold comparator 63 compares a change in voltage of circuit 61 to a threshold voltage, Vref, which is preferably 2.5 volts. If the circuit voltage is higher than Vref, the circuit voltage is assumed to be "high" (e.g., at least one of conductor loops 55, 58 has fractured along with its underlying structure, and its respective head 47 and/or tape guide 40 is damaged), and the output Vout of comparator 63 is a digital 1. If the circuit voltage is lower than Vref, the circuit voltage is assumed to be "low" (head 47 and tape guide 40 are in an acceptable condition), and the output of comparator 63 is a digital 0. In the latter case, drive 11 operates as normal. However, in the former case, drive 11 senses the change and stops running tape 51, which prevents further input and/or output, so that an extensive amount of tape 51 is not ruined by the sharp fractured edges of what remains of head 47 and/or tape guide 50.

In response to the disruption in service, drive 11 signals an operator or requests maintenance so that the damaged head or tape guide can be replaced with a new one. In one version of the invention, warning indicator 38 (FIG. 2) is activated to warn the user to not load media, such as tape cartridge 37, in slot 39. Moreover, loader 27 may be equipped to refuse to load media once either of loops 55, 58 are open and comparator 63 is a digital 1, indicating that either tape guide 40 or head 47 is damaged.

In another version of the invention, drive 11 communicates with, for example, a repair center or maintenance facility 67 via communications equipment 65 when comparator 63 yields a "1." Communications equipment 65 may comprise a wired or wireless transmission via a telephone, a modem for a telephone, a local area network, the internet, etc., for communicating with the repair center.

Figure 1:
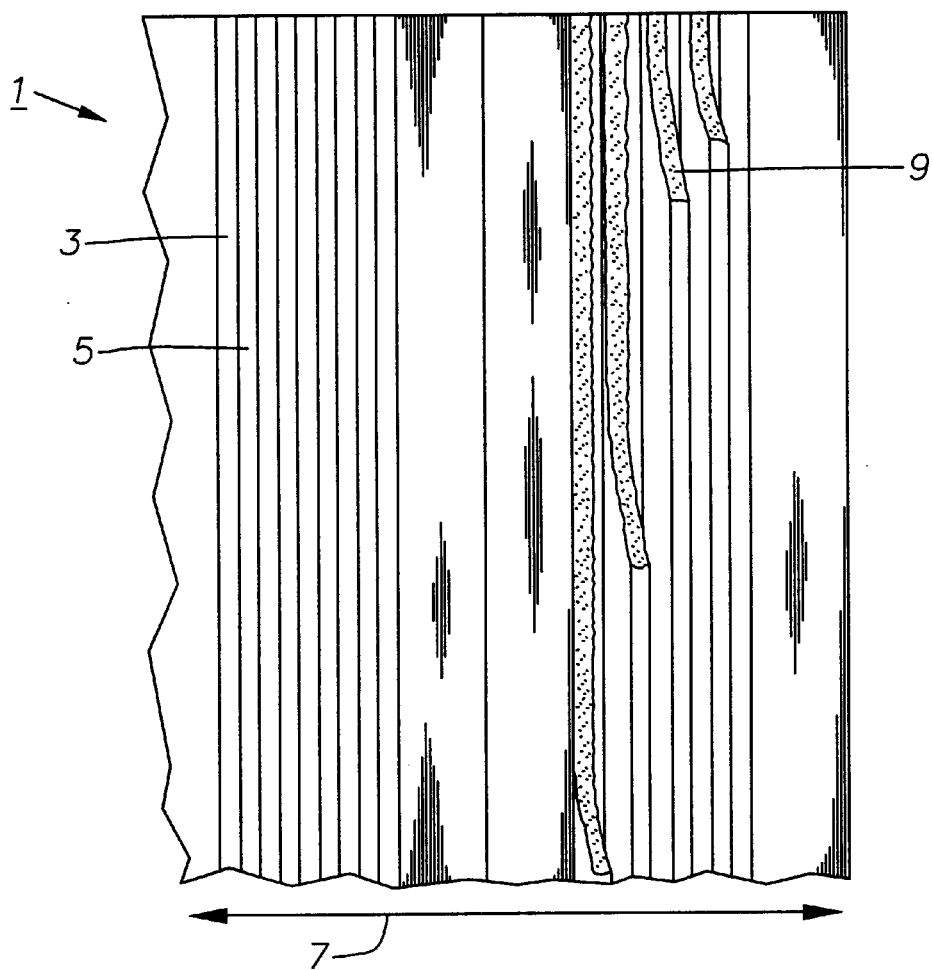
FIG. 1 is a top view of a prior art transducer head that has fractured.

Drive 11 is also has an Emergency Recovery Procedure (ERP). When broken conductor loop 55 is detected, a pneumatic lifter, as taught by U.S. Pat. No. 4,479,158 (incorporated herein by reference), is engaged to push or lift tape 51 away from the broken head 47. When circuit 61 detects a fractured head (see FIG. 1), solenoid 101 (FIG. 4) is engaged to pass the same pressurized air that is being sent to D-bearings 42, to head 47 via hose 102. This pressurized air vents via orifice 103 underneath tape 51, and pushes or lifts tape 51 away from the damaged head 47 so that tape 51 is not damaged by the sharp fractures 9 shown in FIG. 1. In addition, the tension in tape 51 is reduced, which allows the pneumatic lifter to further lift tape 51 away from broken head 47. The ERP reduces the chance of ruining tape 51, and may be used in conjunction with warning indicator 38 and the communication with repair center or maintenance facility 67.

The present invention has several advantages. The damage detection device prevents large quantities of data tape from being damaged by a fractured recording head or tape guide. The damage detection device signals the data tape drive to stop using the damaged component, to alert an operator, or other remedial actions to prevent extensive damage to the data tape. The conductor loops utilized by the damage detection device may be attached to the ends of the side walls, or mounted along the side walls just below the top surface of the side walls to avoid contact with the moving data tape during operation of the data tape drive.

While the invention has been shown or described in only some of its forms, it should be apparent to those skilled in the art that it is not so limited, but is susceptible to various changes without departing from the scope of the invention. For example, the present invention also applies to optical tape.

What is claimed is:

1. A device for interacting with a media, comprising:
    a head guide assembly having a transducer head for processing information with the media;
    drive means for moving the media relative to the transducer head; and
    detection means for detecting damage to the head guide assembly at any point along a length of the head guide assembly.

2. The device of claim 1 wherein the detection means detects a fracture in the head guide assembly.

3. The device of claim 1 wherein the detection means forms an open circuit that is detected by the device when the head guide assembly is damaged.

4. The device of claim 1 wherein the detection means utilizes a conductor loop mounted to the head guide assembly.

5. The device of claim 4 wherein the conductor loop is located along an outer surface of the head guide assembly for detecting fracture damage to the head guide assembly.

6. The device of claim 4 wherein the conductor loop is a thin film conductor that is laminated to the head guide assembly.

7. The device of claim 4 wherein the conductor loop is mounted along sides of the head guide assembly just below a media surface of the head guide assembly to avoid contact with the media while the media is moving during normal operation of the device.

8. The device of claim 1 wherein the detection means senses a change in voltage corresponding to an opening in the conductor loop.

9. The device of claim 8 wherein further processing of information with the media ceases when the change in voltage is detected.

10. The device of claim 8 wherein the device submits a request for maintenance when the change in voltage is detected.

11. The device of claim 1 wherein the transducer head has an air bleed slot with side walls.

12. The device of claim 11 wherein the air bleed slot is perpendicular to the direction of travel of the media.

13. The device of claim 11 wherein the air bleed slot is parallel to the direction of travel of the media.

14. The device of claim 1, further comprising guide means for guiding the media relative to the transducer head, and wherein the detection means detects a fracture in the guide means.

15. A tape drive for reading information from and/or writing information to a data tape of a tape cartridge, the tape drive comprising:
- a transducer head for processing information with the data tape, the transducer head having a tape surface and side walls with an air bleed slot formed therein;
- drive means for moving the data tape of the tape cartridge relative to the transducer head;
- a tape guide located adjacent to the transducer head and having teeth and grooves for guiding the data tape relative to the transducer head; and
- a circuit extending continuously through each of the side walls of the transducer head and each of the teeth of the tape guide for detecting a fracture in the transducer head and the tape guide, wherein the circuit is opened when the fracture occurs and the circuit opening is detected by the tape drive.

16. The tape drive of claim 15 wherein at least a portion of the circuit is mounted to the transducer head and to the tape guide.

17. The tape drive of claim 15 wherein the circuit is located along outer surfaces of the transducer head and the tape guide.

18. The tape drive of claim 15 wherein at least a portion of the circuit is a thin film conductor that is laminated to the transducer head and to the tape guide.

19. The tape drive of claim 15 wherein at least a portion of the circuit is mounted along the side walls of the transducer head just below the tape surface of the transducer head to avoid contact with the data tape while the data tape is moving during normal operation of the tape drive.

20. The tape drive of claim 15 wherein the circuit senses a change in voltage corresponding to the opening in the circuit.

21. The tape drive of claim 20 wherein further processing of information with the media ceases when the change in voltage is detected.

22. The tape drive of claim 20 wherein the circuit compares the change in voltage to a threshold voltage.

23. The tape drive of claim 22 wherein the device submits a request for maintenance when the change in voltage exceeds the threshold voltage.

24. The tape drive of claim 23 wherein the device submits the request for maintenance to a repair center via wireless communication.

25. The tape drive of claim 23 wherein the device submits the request for maintenance to a repair center via the internet.

26. The tape drive of claim 15 wherein the transducer head is a magnetic head for processing information with magnetic tape.

27. The tape drive of claim 15 wherein the transducer head is an optical head for processing information with optical tape.

28. The tape drive of claim 15, further comprising an emergency recovery procedure means for moving the data tape away from the transducer head when the circuit is opened.

29. A transducer head assembly in a device for reading information from and/or writing information to a media, the transducer head comprising:
- a base having a media surface, side walls, and air bleed slots and teeth formed with the media surface and side walls;
- a conductor loop mounted to the base to form an electrical circuit that extends continuously through each of the teeth across an entire length of the media surface;
- monitor means interconnected with the conductor loop for monitoring the electrical circuit and detecting an open circuit therein, such that a fracture in the base produces an opening in the electrical circuit that is detected by the monitor means anywhere along the entire length of the media surface by sensing a change in voltage corresponding to the opening in the electrical circuit and comparing the change in voltage to a threshold voltage; and wherein
- the monitor means submits a request for maintenance when the change in voltage exceeds the threshold voltage.

30. The transducer head assembly of claim 29 wherein the conductor loop is a thin film that is laminated to the base and side walls.

31. The transducer head assembly of claim 29 wherein the conductor loop is mounted along the side walls of the base just below the media surface to avoid contact with the media while the media is moving during normal operation of the device.

32. The transducer head assembly of claim 29 wherein the monitor means submits the request for maintenance to a repair center via wireless communication.

33. The transducer head assembly of claim 29 wherein the monitor means submits the request for maintenance to a repair center via the internet.

34. The transducer head assembly of claim 29 wherein the transducer head is a magnetic head for processing information with magnetic tape.

35. The transducer head assembly of claim 29 wherein the transducer head is an optical head for processing information with optical tape.

* * * * *